United States Patent [19]

Kucklick

[11] 4,132,340
[45] Jan. 2, 1979

[54] WELDING METHOD AND APPARATUS

[75] Inventor: Frederick C. Kucklick, South Bend, Ind.

[73] Assignee: Manufacturing Technology, Inc., Mishawaka, Ind.

[21] Appl. No.: 810,170

[22] Filed: Jun. 27, 1977

[51] Int. Cl.$^2$ ............................................. B23K 19/02
[52] U.S. Cl. ........................................ 228/113; 228/2
[58] Field of Search ..................... 228/2, 112, 113, 114

[56] References Cited

U.S. PATENT DOCUMENTS

| | | | |
|---|---|---|---|
| 3,478,411 | 11/1969 | Goloff et al. | 228/113 |
| 3,623,742 | 11/1971 | Funk et al. | 228/2 X |
| 3,763,549 | 10/1973 | Bonneville et al. | 228/112 |
| 3,824,663 | 7/1974 | Sohn et al. | 228/112 X |

Primary Examiner—James L. Jones, Jr.
Assistant Examiner—K. J. Ramsey
Attorney, Agent, or Firm—Craig & Antonelli

[57] ABSTRACT

A method and apparatus for welding a first workpiece which is to be joined to a second workpiece, with said first workpiece extending within or through the second workpiece. The apparatus includes a rotatable workpiece drive member, a workpiece holding fixture for securing at least one other workpiece in position relative to the first workpiece and a radial support for the first workpiece that is separate and spaced from the drive member. Among the preferred embodiments disclosed for providing the radial support are a tailstock supporting sleeve arrangement, collet chucking, and roller type steady rests.

10 Claims, 4 Drawing Figures

WELDING METHOD AND APPARATUS

BACKGROUND AND SUMMARY OF THE INVENTION

This invention is directed in general to the joining of a plurality of workpieces for assemblies wherein it is important to accurately position one workpiece with respect to another, and wherein problems arise due to a lack of proper radial support for one of the workpieces.

The preferred embodiment related to friction welding and more particularly to a method and apparatus for inertia welding spindle assemblies and other assemblies wherein a first workpiece is to be welded within or extending through at least one other workpiece such that the proper radial positioning of the first workpiece with respect to the at least one other workpiece is of importance.

Inertia type friction welding has been widely employed for joining many types of workpieces. In many cases, one workpiece is to be joined within or extending through a second workpiece, and due to the length of the first workpiece and/or the tolerances involved, obtaining proper radial positioning between the parts to be joined has posed a significant problem.

Conventionally, in inertia welding one workpiece is rotated with respect to a second workpiece, and once the proper speed is reached the rotational drive is disconnected via a clutch mechanism and one of the workpieces is upset into contact with the other to cause the workpieces to bond together. In prior art devices for practicing this type of inertia welding, the drive mechanism which rotated one of the workpieces also served to provide the workpiece with radial support. In certain instances, where elongated workpieces were to be bonded, a collet such as shown in U.S. Pat. No. 3,452,421 was utilized which enabled the workpiece to pass through the collet into the shaft of the drive member. In this manner, the amount of unsupported workpiece extending out of the chuck towards the other workpiece to which it was to be bonded could be held to a minimum. However, in inertia welding certain types of structures such as spindle assemblies for automotive vehicles, the elongated workpiece could not be grasped closely to its free end due to the configuration of the workpiece to which it is to be bonded, and also due to the fact that the elongated workpiece had to extend into and through the other workpiece so as to be bonded in the proper position. Therefore, inertia welding those types of assemblies posed a problem due to the fact that it was not possible to shorten up on the elongated workpiece, thereby producing corresponding problems with respect to dimensional accuracy and alignment of the workpieces after welding.

It is, therefore, a primary object of this invention to provide a method and apparatus for inertia welding assemblies which include an elongated workpiece and which obviate the above-noted problems with respect to dimensional accuracy and alignment of the workpieces.

The present invention solves these problems by supporting the rotating elongated workpiece both in the headstock which provides the rotational drive and in a separate radial support attached to or positioned on the opposite side of the tailstock, and since the elongated workpiece is supported at both ends, better dimensional accuracy and alignment can be achieved. Where the elongated workpiece passes through the member to which it is to be joined a sufficient distance to be grasped or held, the invention contemplates the use of various arrangements for providing the radial support such as collet chucking, tailstock supporting sleeves, or roller type steady rests. In those instances where the elongated workpiece does not extend completely through the workpiece, or where it does not extend sufficiently through the workpiece so as to be held within a supporting member, the invention contemplates providing the elongated workpiece with an extension member which can be fitted within the radial support member, or the use of a pin member extending from the radial support into engagement with the elongated workpiece.

These and other features, advantages and objects of this invention will become more apparent from the following detailed description and drawings in which:

DETAILED DESCRIPTION OF THE DRAWINGS

Figure 1:
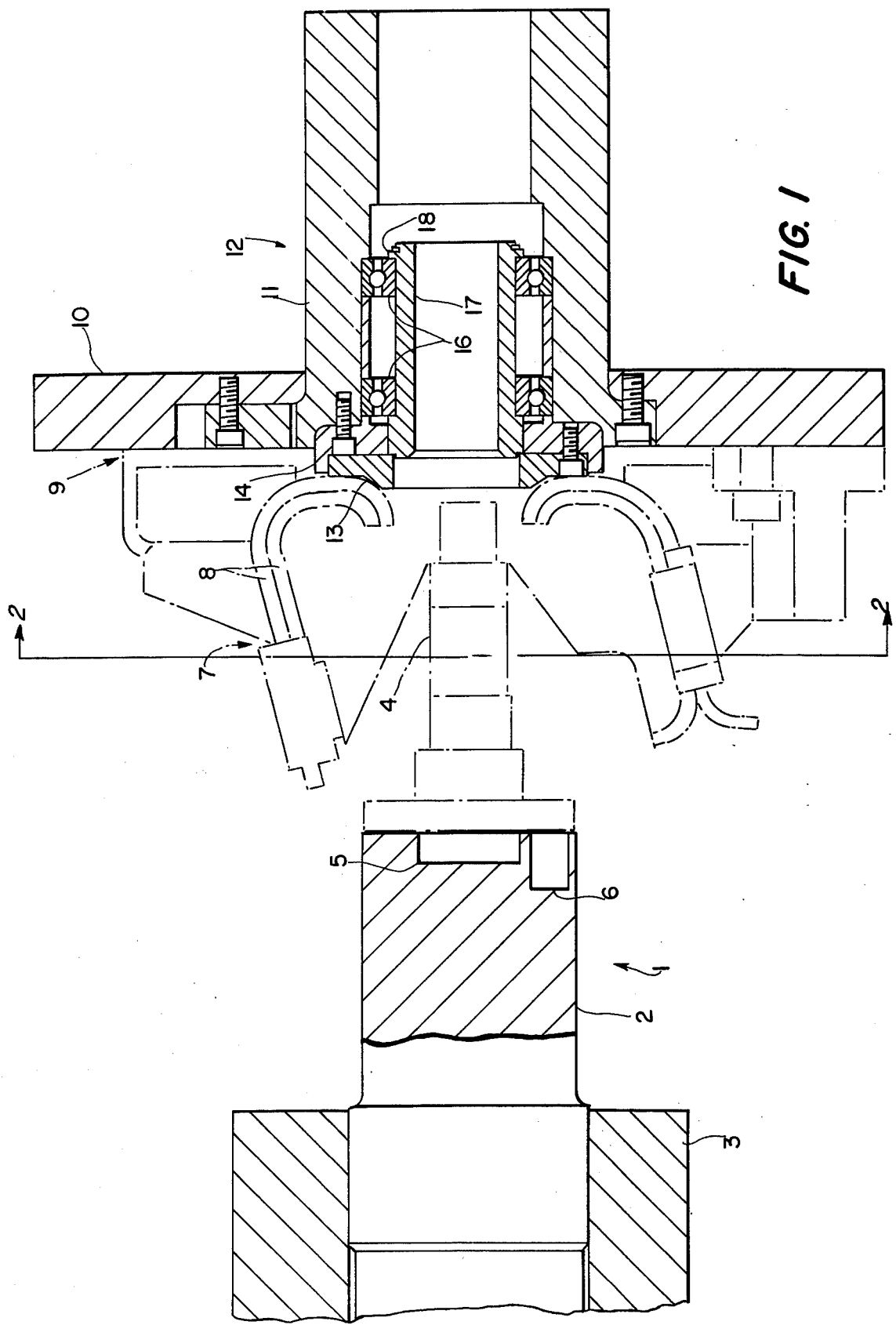
FIG. 1 is a side sectional view of a portion of an inertia welder showing workpiece holding fixtures constructed in accordance with a preferred embodiment of the invention and holding workpieces to be welded.

In FIG. 1, an inertia welder 1 has a rotatable drive spindle 2 driven by a suitable motor 3 which is only schematically represented. An elongated workpiece 4, shown only in phantom outline, has its left end extending within a drive socket 5 which provides positive rotational driving forces to the elongated workpiece 4 via its socket preferalby shaped in the form of a hex, slot, square, triangle, or crosskey which receives a complementary shaped end of the workpiece. It is also contemplated to use other recesses having various other shapes in addition to those mentioned above. The end of the workpiece 4 is additionally held secure within the spindle 2 by magnets 6 which are positioned therein so as to be flush with its frontal face in the preferred illustrated embodiment.

Referring further to FIG. 1, a second workpiece 7, formed of a plurality of heavy sheet metal workpiece parts 8, is shown mounted to a workpiece holding fixture 9. The workpiece holding fixture 9 has a support plate 10 within which carriage 11 of a radial support assembly 12 is mounted. A contour plate 13 is mounted to an end plate 14 of the carriage 11, and the workpiece 7 is held in proper position against the contour plate 13 by a plurality of aligning and holding elements 15 (shown in FIG. 2).

The radial support assembly 12 comprises, in addition to the carriage 11, a bearing 16 which is held in position within the carriage by the end plate 14. A workpiece adapter sleeve 17 is held in position within the bearing 16 by clip 18 in conjunction with the contour plate 13. By disconnecting the clip 18 and the contour plate 13, various shaped sleeves can be inserted within the bearing so as to adapt the radial support assembly for use with elongated workpieces of various configuration.

Furthermore, in addition to sleeve-like adapter members 17, in those instances wherein the rotating workpiece 4 does not extend sufficiently through the other workpiece 7 so as to be received within a sleeve-like member, the sleeve can be replaced with an abutment pin adapter which can extend through the contour plate 13 into engagement with the workpiece 4. Alternatively, in such circumstances where space will not permit the utilization of such a chucking arrangement, an extension member can be attached to the workpiece 4 which would extend into the adapter member 17 so as to provide the requisite alignment and rotatable radial support, according to yet other preferred embodiments of the invention.

To inertia weld using the configuration shown in FIG. 1, the first workpiece 4 is engaged with the rotatable workpiece drive member 2 by positioning it within the socket 5 and holding it fast via the magnets 6. The other workpiece or workpieces 7 are then supported and held fast against the replaceable contour plate 13 via the elements 15. The first workpiece 4 is then moved axially with respect to the fixture 9 so as to bring the workpiece 4 into radially supportive engagement within the adapter 17. The workpiece 4, which is still spaced slightly from engagement with the workpiece 7, is then rotated at high speed, and once the proper speed is achieved, the drive is disconnected and the workpiece 4 is upset into welding engagement with the workpiece 7. Since both workpiece parts 4 and 7 essentially are radially held in a common fixture 9, a high degree of dimensional accuracy and alignment of the workpieces after welding is achieved.

Figure 3:
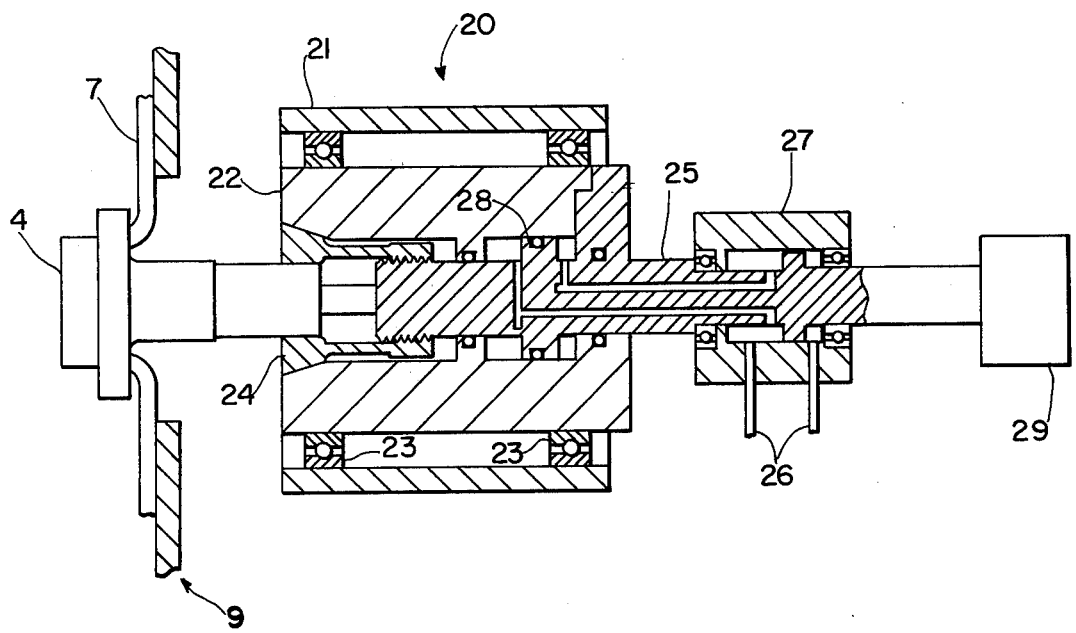
FIG. 3 is a cross-sectional view partially in schematic form illustrating an alternative embodiment of radial supporting means.

FIG. 3 shows another embodiment of radial supporting means which utilizes a collet type chucking mechanism. The radial support assembly 20 of this embodiment has a carriage 21 within which the chuck 22 can rotate via the bearings 23. The chuck 22 has mounted within it a chuck collet 24 which threadingly engages a collet actuator 25. As is apparent from FIG. 3, by supplying a fluid pressure medium through the lines 26 in rotary union 27, fluid may pass through the collet actuator 25 to the chambers formed on opposite sides of a piston 28 formed on the collet actuator 25. In this manner, the collet actuator 25 may be reciprocated and with it the chuck collet 24, thereby causing the collet to grasp the end of the workpiece 4 in its proper aligned position, supplying the needed radial support.

In this embodiment of FIG. 3, the radial support assembly 20 is preferably mounted separate from the fixture 9 for workpiece 7 (fixture 9 only being shown schematically in FIG. 3 as it can be constructed similar to the FIG. 1 and 2 embodiment) so that by mounting the carriage 20 within linear bearings (not shown), the radial support assembly 20 can be used as the mechanism to upset the workpiece 4 into welding engagement with the workpiece 7 by displacing axially the carriage 21, and with it the workpiece 4 grasped within the collet chuck 22 via a hydraulic or air cylinder which is only schematically illustrated at 29.

Figure 2:
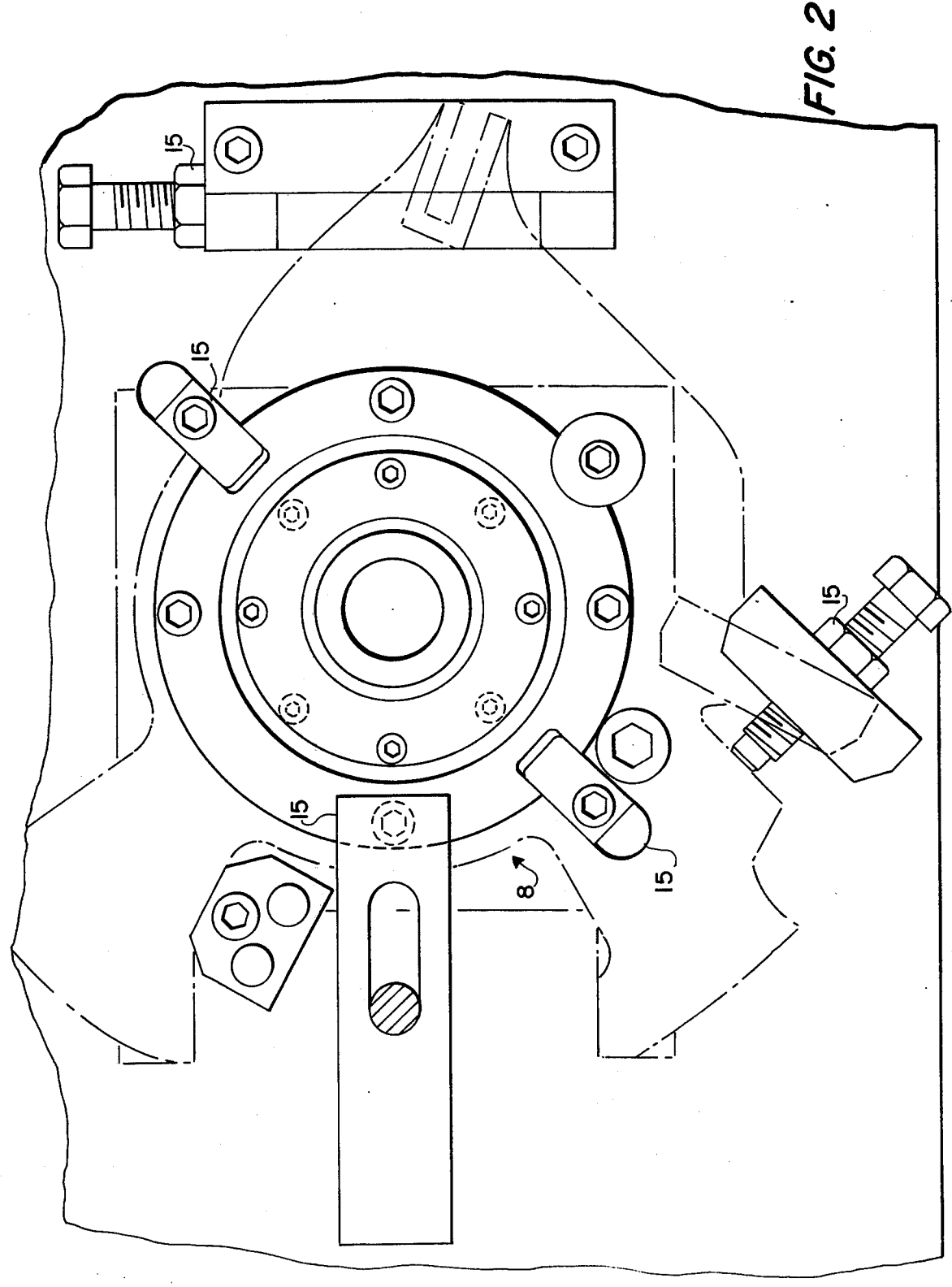
FIG. 2 is a cross-sectional view taken along line II—II of FIG. 1 showing a frontal view of one of the workpiece holding elements of the welder.

With the exception of this last-noted manner of upsetting the workpieces into engagement, the process of welding using the embodiment of FIG. 3 is essentially the same as that described with respect to the embodiment of FIGS. 1 and 2. Furthermore, like the first embodiment, a pin type adapter member can be grasped within the collet and that pin member can be used to engage workpieces which do not extend sufficiently beyond the other workpiece to be grasped at its far end by the collet. And also, like the first embodiment of FIG. 1, since the workpiece 4 is radially supported at a position spaced axially from the rotational drive engagement great dimensional accuracy and alignment can be achieved between the workpieces in a simple, economical manner.

Figure 4:
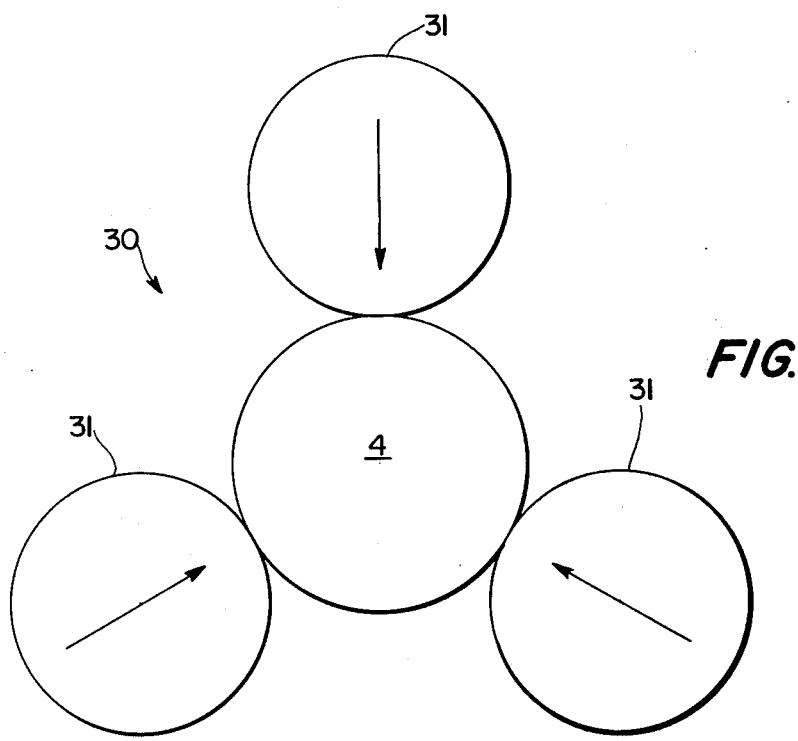
FIG. 4 is a schematic representation of yet another embodiment of radial supporting means.

FIG. 4 schematically illustrates yet another radial support arrangement for the first workpiece 4. In this embodiment, a selfcentering roller type steady rest mechanism 30 comprised of a plurality of rollers 31 is used to support and locate the end of workpiece 4 relative to the other workpiece 7 secured within the fixture 9. Workholders of the steady rest roller type are known per se, and as such, no further description beyond the schematic representation in FIG. 4 is deemed necessary for one skilled in the art to adapt such a workholder to the apparatus of the present invention.

It is additionally noted that the method of welding utilizing the radial support embodiment of FIG. 4 is essentially the same as that utilizing the previously described embodiments.

In view of the above description with respect to the preferred embodiments, it is clear that applicant has devised an improved inertia welding method and apparatus that enables parts to be welded together with great dimensional accuracy and alignment as well as facilitates the welding of configurations previously not suited to inertia welding. It is also clear that one of ordinary skill in the art will be able to utilize various other forms of radial support for the workpiece as well as various other modifications including embodiments wherein the workpieces are joined together with being frictionally welded, e.g. threadingly, or force fit together and as such, this invention is not limited to the details of the preferred method and apparatus which is shown and described for the purposes of illustrating the invention.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. The process of welding a first workpiece to at least one other workpiece comprising the steps of:
   engaging one end of said first workpiece with a rotatable workpiece drive member;
   supporting at least one other workpiece in a workpiece holding fixture;
   providing radial support for said first workpiece at a point not on the same side of said at least one other workpiece as said workpiece drive member by inserting said first workpiece within a collet member that is mounted so as to be rotatable and axially displaceable;
   and rapidly rotating said first workpiece and forcing it into engagement with said at least one other workpiece so as to friction weld the workpieces along their common interface.

2. The welding porcess according to claim 1, further comprising the step of extending said first workpiece through said at least one other workpiece.

3. The welding method according to claim 1, wherein the step of forcing said first workpiece into engagement with at least one other workpiece includes the steps securing a portion of said first workpiece to said collet member, and displacing said collet member axially relative to said at least one other workpiece.

4. The welding method according to claim 1, wherein said rapidly step of rotating said first workpiece includes rotatably driving said workpiece drive member to a predetermined rotative speed, followed by a disengagement of said workpiece drive member from any driving force so that said workpiece drive member and parts working therewith continue to rotate due to inertial energy buildup which is dissipated during welding of said workpieces.

5. Apparatus for use in joining workpieces such as welding machines and the like, comprising:
  (a) rotatable workpiece drive means engageable with a first workpiece for rotating said first workpiece;
  (b) workpiece holding means for securing at least one other workpiece;
  (c) radial support means for said first workpiece separate and spaced from said drive member, said radial support means being positioned on said apparatus at a point not on the same side of said holding means as said drive means; and
  (d) means for providing relative axial movement between said first workpiece and said at least one other workpiece, wherein said radial support means is attached directly to said workpiece holding means, and wherein said radial support ments comprises:
  a carriage connected to said holding means;
  bearing means mounted within said carriage means for facilitating relative rotational movement between said first workpiece and said carriage means; and
  adapter means removably mounted within said bearing means for receiving a portion of said first workpiece.

6. Apparatus according to claim 5, wherein said radial support means is structured so as to permit said first workpiece to be displaced axially relative to said radial support means while being rotatably and radially supported therein.

7. Apparatus of claim 5, wherein said driving means has a socket for receiving a portion of said first workpiece and magnetic means for retaining said workpiece within said socket.

8. Apparatus according to claim 5, wherein disengageable clutch means are provided for accommodating uncoupling of said workpiece drive means from driving force means upon reaching a predetermined rotational speed so that said first workpiece and parts moving therewith continue to rotate due to inertial energy buildup which is dissipated in the welding process.

9. Apparatus for use in joining workpieces such as welding machines and the like, comprising:
  (a) rotatable workpiece drive means engageable with a first workpiece for rotating said first workpiece;
  (b) workpiece holding means for securing at least one other workpiece;
  (c) radial support means for said first workpiece separate and spaced from said drive member, said radial support means being positioned on said apparatus at a point not on the same side of said holding means as said drive means; and
  (d) means for providing relative axial movement between said first workpiece and said at least one other workpiece;
  wherein said radial support means includes a rotatable and axially displaceable collet means.

10. Apparatus for use in joining workpieces such as welding machines and the like, comprising:
  (a) rotatable workpiece drive means engageable with a first workpiece for rotating said first workpiece;
  (b) workpiece holding means for securing at least one other workpiece;
  (c) radial support means for said first workpiece separate and spaced from said drive member, said radial support means being positioned on said apparatus at a point not on the same side of said holding means as said drive means; and
  (d) means for providing relative axial movement between said first workpiece and said at least one other workpiece;
  wherein said radial support means includes a rotatable and axially displaceable collet means, wherein said collet means includes means for grasping a portion of said first workpiece, and wherein said means for providing relative axial movement includes means for displacing said collet means so as to upset said first workpiece against said at least one other workpiece.

* * * * *